July 27, 1943.    T. J. MURPHY    2,325,267
DRY SHAVER CUTTER HEAD
Filed Sept. 24, 1941    4 Sheets-Sheet 1
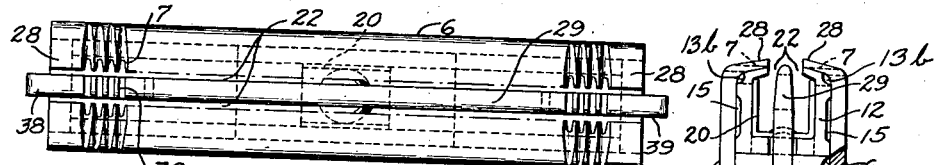
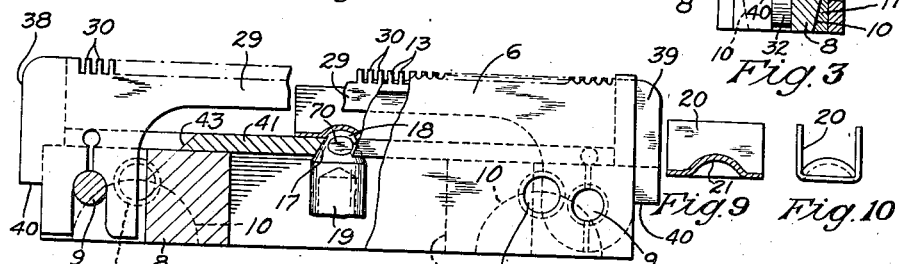
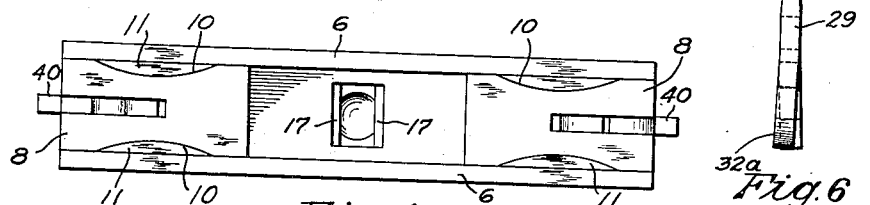
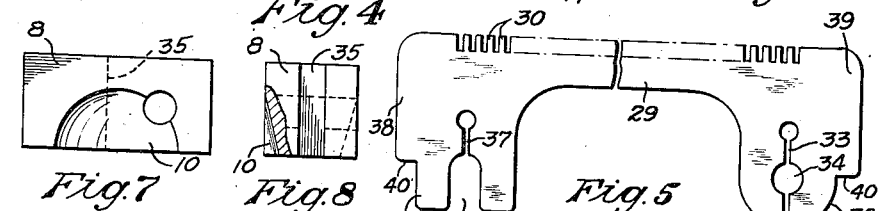
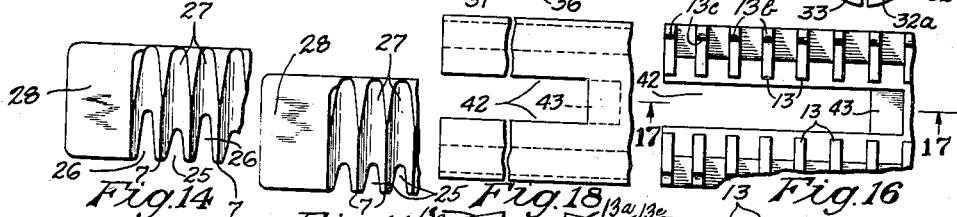
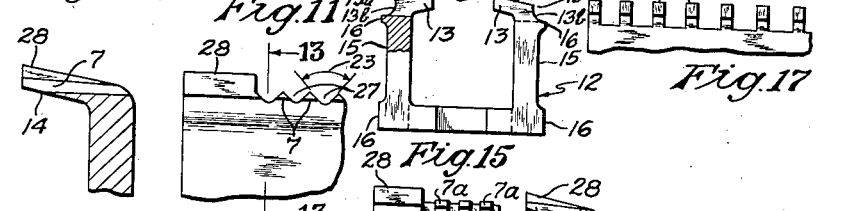
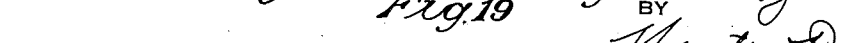
INVENTOR
Thomas J. Murphy
BY
Wooster & Davis
ATTORNEYS.

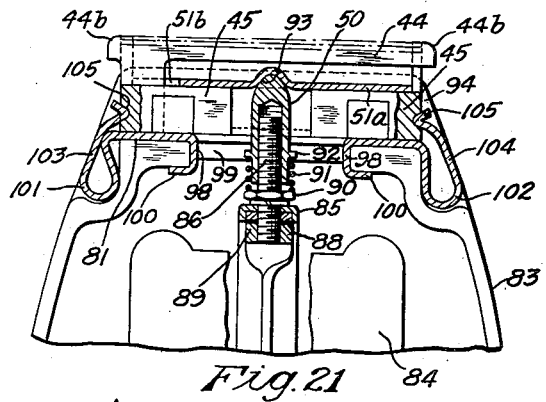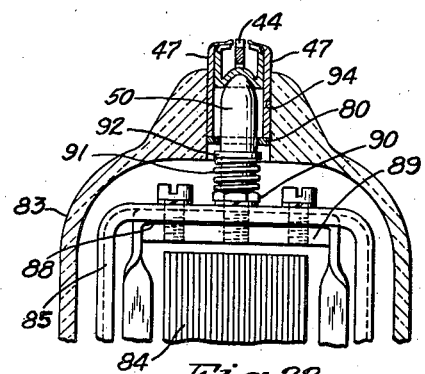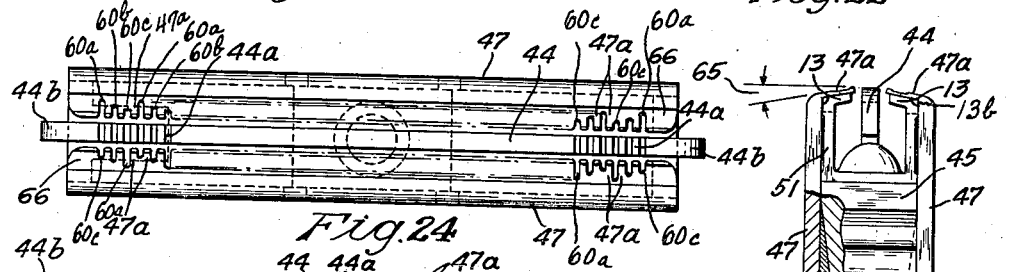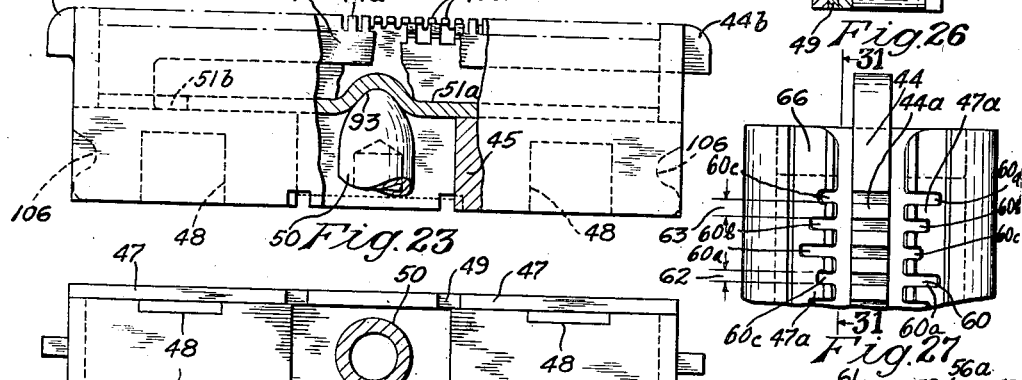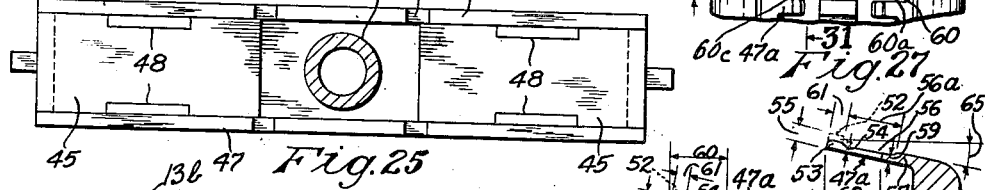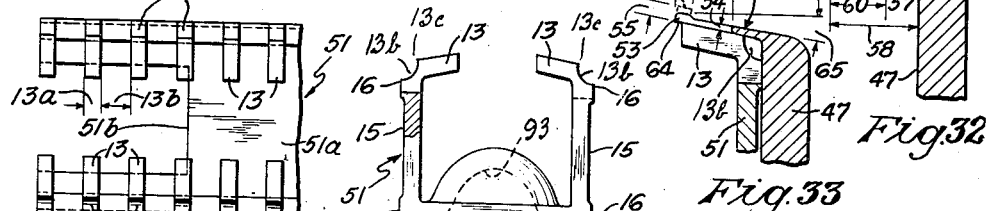

July 27, 1943.   T. J. MURPHY   2,325,267
DRY SHAVER CUTTER HEAD
Filed Sept. 24, 1941   4 Sheets-Sheet 3
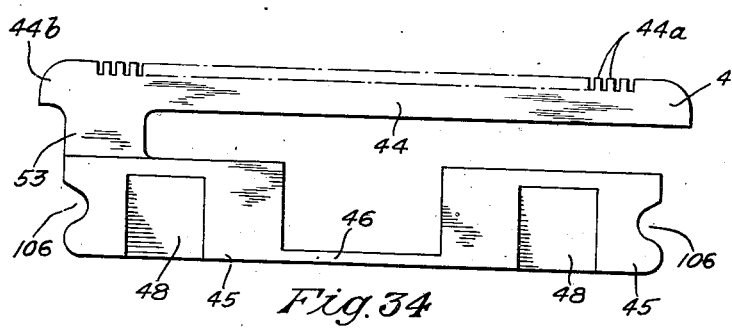
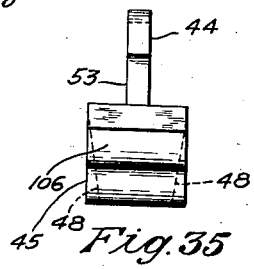
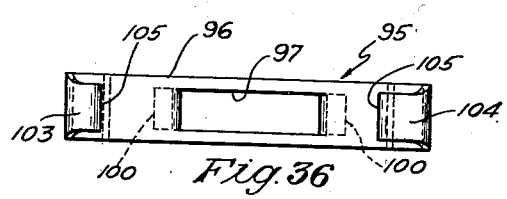
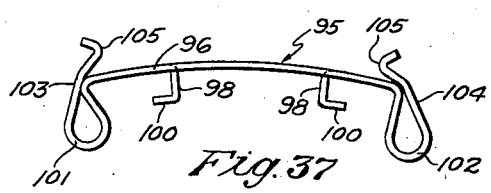
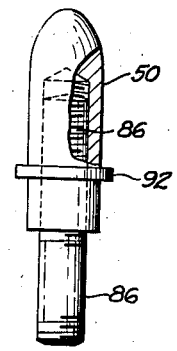
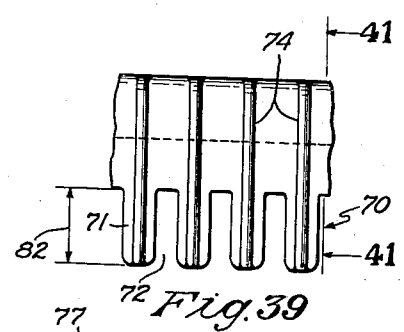
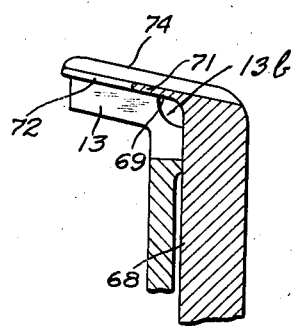
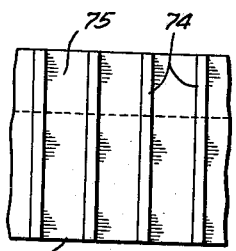
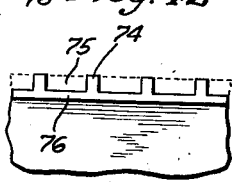
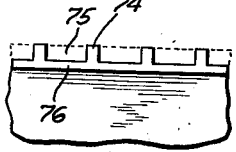
INVENTOR
Thomas J. Murphy
BY
Wooster & Davis
ATTORNEYS.

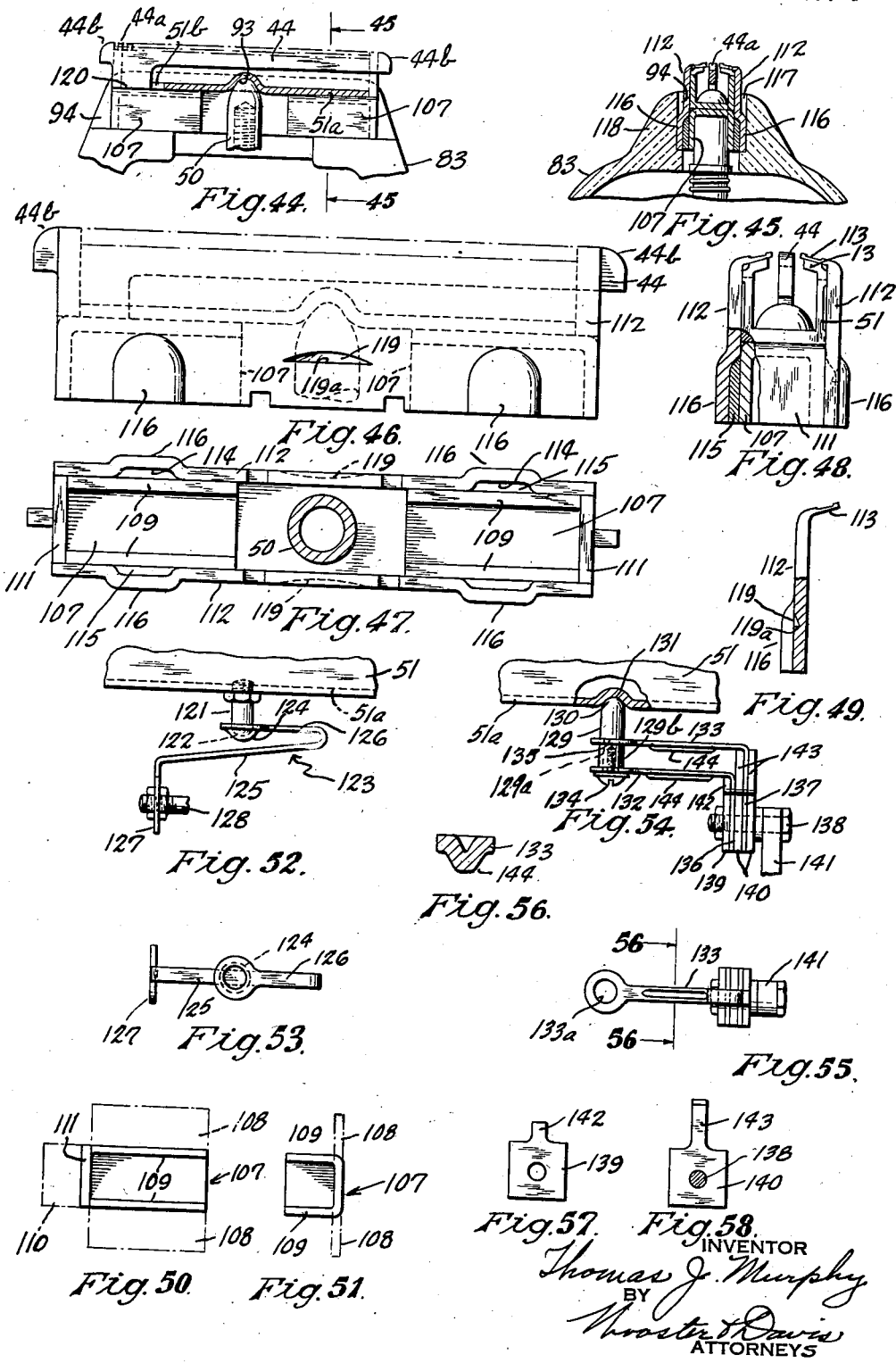

Patented July 27, 1943

2,325,267

UNITED STATES PATENT OFFICE 2,325,267

DRY SHAVER CUTTER HEAD

Thomas J. Murphy, Stamford, Conn.

Application September 24, 1941, Serial No. 412,055
In Canada September 27, 1940

19 Claims. (Cl. 30—43)

This invention relates to dry shaving devices and has for an object to provide an improved dry shaver construction which will operate more effectively and efficiently to rapidly cut the hairs close to the skin without injuring or irritating the skin.

With the foregoing and other objects in view I have devised an improved construction as illustrated in the accompanying drawings forming a part of this specification. It is, however, to be understood that I am not limited to the specific details shown but may employ various changes and modifications within the scope of the invention.

In these drawings:

Fig. 1 is a partial side elevation and a partial section of the cutter head on an enlarged scale;

Fig. 2 is a top plan view thereof;

Fig. 3 is an end view with parts broken away to more clearly show the construction;

Fig. 4 is a bottom plan view of the cutter head;

Fig. 5 is a side elevation of the center comb or guard removed from the head;

Fig. 6 is an end view thereof;

Fig. 7 is a side elevation of a filler block employed in the head;

Fig. 8 is a partial end view and partial section thereof;

Figs. 9 and 10 are a longitudinal section and end view respectively of a cover member for the inner end of the actuating stud;

Fig. 11 is a top plan view of one end showing a few of the teeth of the stationary guard on one side of the central comb or guard;

Fig. 12 is a view looking toward the bottom of Fig. 11;

Fig. 13 is a transverse section substantially on line 13—13 of Fig. 12;

Fig. 14 is a view similar to Fig. 11 showing a slightly different construction;

Fig. 15 is a partial end view and a partial section of the inner or movable cutter;

Fig. 16 is a top plan view of one end portion thereof;

Fig. 17 is a view looking toward the free ends of the teeth of Fig. 16, the view being taken substantially on the line 17—17 of Fig. 16;

Fig. 18 is a bottom plan view of one end of this movable cutter;

Fig. 19 is a view similar to Fig. 12 showing a modified construction;

Fig. 20 is a section looking from the right of Fig. 19;

Fig. 21 is a vertical central section of the head end of the casing in which the cutter head may be mounted and showing how it may be connected to an operating motor, the cutter head shown being somewhat modified from the construction shown in Figs. 1, 2 and 3;

Fig. 22 is a section taken at right angles to Fig. 21;

Fig. 23 is a partial side elevation and partial section of a somewhat modified construction of cutter head;

Fig. 24 is a top plan view thereof;

Fig. 25 is a bottom plan view thereof;

Fig. 26 is an end elevation with a portion broken away to more clearly show the construction;

Fig. 27 is a top plan view of one end portion on a larger scale;

Fig. 28 is a top plan view of one end portion of the inner or movable cutter;

Fig. 29 is an elevational view looking toward the free ends of the upper row of cutter teeth in Fig. 28;

Fig. 30 is an end elevation of the cutter of Fig. 28 with parts broken away to more clearly show the construction;

Fig. 31 is a detail view looking toward the free ends of the cutter teeth at one end portion of the head, the view being taken substantially on line 31—31 of Fig. 27;

Fig. 32 is a transverse section on an enlarged scale through the upper portion through one of the side plates forming the outer or stationary cutters;

Fig. 33 is a similar section showing a slight modification;

Fig. 34 is a side elevation of the spacing block and comb guard;

Fig. 35 is an end elevation thereof;

Fig. 36 is a top plan view of the securing spring for holding the cutter head in the motor housing;

Fig. 37 is a side elevation thereof;

Fig. 38 is a partial side elevation and partial section of the operative connecting means between the actuating motor and the movable cutter;

Fig. 39 is a top plan view on an enlarged scale of a modified construction of the outer stationary guard or cutter teeth;

Fig. 40 is a view looking toward the free ends of these teeth on a still larger scale;

Fig. 41 is a transverse section substantially on line 41—41 on Fig. 39;

Fig. 42 is a top plan view of the blank from which the construction of Figs. 39 to 41 is made showing the effect secured by the first operation;

Fig. 43 is an edge view thereof looking toward the bottom of Fig. 42.

Fig. 44 is a partial side elevation of the head end of the casing and cutter head therein showing a somewhat modified construction;

Fig. 45 is a transverse section thereof substantially on line 45—45 of Fig. 44.

Fig. 46 is a side elevation of the head of Fig. 44;

Fig. 47 is a bottom view thereof;

Fig. 48 is an end view thereof with parts broken away to more clearly show the construction;

Fig. 49 is a partial end view and partial section of one of the side members or plates of the housing;

Fig. 50 is a bottom view of one of the spacing blocks of Figs. 44 to 48;

Fig. 51 is an end view thereof;

Fig. 52 is a side elevation of one form of connecting drive from the motor or activator to the inner or movable cutter;

Fig. 53 is a bottom view thereof;

Fig. 54 is a side view of a different construction of connecting drive from the motor to the cutter;

Fig. 55 is a bottom view thereof;

Fig. 56 is a transverse section of one of the spring members of Figs. 54 and 55 taken substantially on line 56—56 of Fig. 55;

Fig. 57 is a face view of one of the backing-up elements of Figs. 54 and 55, and Fig. 58 is a similar view of the other backing-up elements of this construction.

This application is a continuation in part of my prior application Ser. No. 151,813, filed July 3, 1937, and which issued December 2, 1941, as Patent No. 2,264,398.

Referring first to Figs. 1 to 20 inclusive, this cutter head comprises two side members 6 each having at its upper edge inwardly extending stationary guard and cutter teeth 7. These side members 6 are held in proper spaced relation by two intermediate longitudinally spaced blocks 8 at the opposite ends of the head and between the side members 6, there being transverse pins 9 extending through the side members and the blocks, and the side members being secured to the blocks by soldering. Either the inner surfaces of the side plates 6 or the opposite sides of the blocks 8 are recessed as indicated at 10 with tapered curved recesses to receive soldering material 11 and insure carrying of the solder to the contacting surfaces between the side members and the blocks. It will be apparent that when once assembled this makes a very strong rigid construction which always maintains the side members and their guard and cutter teeth in the same relative positions indefinitely. Also, as the side members can be finished before assembly proper necessary access is given to all parts of the guard and cutter teeth permitting proper and accurate forming and finishing.

It will be seen from Figs. 1 and 3 the blocks 8 extend only part way from the bottom edges to the top of the side members 6 leaving a substantially rectangular passage or channel between the tops of the blocks 8 and the underside of the stationary guard and cutter teeth 7. Mounted in this channel and reciprocable longitudinally therein is the inner or movable cutter 12. This reciprocating cutter is of substantially rectangular cross section with inwardly extending cutter teeth 13 along the upper edges of the side walls. These teeth as shown in Figs. 3 and 15 are slightly inclined corresponding to the incline 14 (Fig. 13) at the undersides of the teeth 7 of the stationary guard. In the outer surfaces of the side walls the walls are cut away forming longitudinal channels 15 leaving longitudinal reduced bearing surfaces 16 against the side members 6 thus reducing the friction and permitting easier operation. It also facilitates the oiling of the bearing surfaces. Also there are ground longitudinal channels or notches 13b at the outer ends of the teeth or outer side corners or edges of the cutter leaving a space between the inner cutter and the inner wall of the outer cutter 6 and providing sharp edges 13c at the opposite edges of this space to prevent a wedging action on cut hairs which might work into this space and prevent these hairs working into the space between the inner cutter teeth 13 and the outer cutter teeth 7 to thus cause a separation of these teeth and interfere with the proper shearing or cutting operation. It has been found that with the inner cutter fitting the outer with a rounded corner cut hairs will work in between the movable and stationary teeth. This cut out 13b will also prevent hairs working into the bearing surfaces 16. The bottom wall of this member has a tapered recess 17 (Fig. 1) to receive the tapered end 18 of an operating pin or stud 19 for reciprocating the cutter 12, this actuating stud being operated by an electrical actuator as will later be described. It is preferred to place over the free end 18 a substantially U-shaped plate or cover 20 to prevent cut hairs getting into the bearing between the stud and the reciprocating cutter. The bottom of this cover is recessed as shown at 21 to seat on the end of the stud and hold the cover in place. The distance between the side walls of this cover are substantially the distance between the sides of the cutter as shown in Fig. 3, so that it is properly positioned in the cutter and prevents the cut hairs getting into the bearing.

As indicated above the stationary cutter teeth 7 extend inwardly from the upper edges of the side members 6 toward each other, but the free ends are spaced from each other leaving a longitudinal slot 22. These teeth may be of various shapes, those shown in Figs. 2 and 11 to 14 being of substantially triangular shape as shown in Fig. 12, the angle between the adjacent inclined side walls indicated at 23 being preferably about 100° although this may vary, and the distance 24 between the centers of the teeth being about .022 of an inch and leaving a space between the edges of the teeth of about .012 inch as indicated at 25 but which is preferably tapered slightly inwardly as indicated. I am not limited to these dimensions but it has been found from experiment that these permit cutting of the hair close to the skin without permitting the skin to project sufficiently into the space between the teeth to cause irritation of the skin by the movable cutter. It will of course be understood that the thinner the teeth the less strength or rigidity, and therefore the depth of the notches 25 between the teeth and the length of the overhanging free portion of the teeth will be limited. However, the greater the depth of the notches 25 the more readily the hair will enter between the teeth to be cut off by the coaction of the sharp side edges of the teeth 7 and the side edges of the teeth 13 of the movable cutter. I have found as indicated in Fig. 14 that I may make alternate notches between the teeth deeper as shown at 26, or as shown in Figs. 24 and 27, without objectionably weakening the teeth and giving still further ready access of the hairs to the space between the teeth to give better and faster shaving. This arrangement gives extra strength where the teeth are very thin and thus permits the use of thinner teeth to secure closer shaving. In assembling it is preferred that the shorter notches 25 in one set of teeth be opposite the longer notches 26 in the other set on the opposite side of the central longitudinal slot 22, so that as the head is moved back and forth on the skin the longer notches or teeth will take the longer hairs and the shorter notches or teeth the shorter hairs. The trough or space between the teeth is continued backwardly from the inner ends of the notches 25 and 26, as indicated at 27, either to run out in the top surface of the guard members or at the outer edges thereof. As indicated, however, I am not limited to the use of substantially triangular teeth, but as shown in Fig. 19 these teeth indicated at 7a may be substantially rectangular in cross section giving somewhat greater rigidity. It is to be understood that the side edges at the lower surfaces of the teeth cooperate with the edges of the teeth 13 on the movable cutter to give a shearing effect for cutting the hair the same as in the first form, and this shearing action is improved by slightly tapering the notches between the teeth so that the side or cutting edges are inclined. It will be noted that in neither case are the teeth formed in the side members 6 clear up to the ends thereof, but that a substantially flat or plain surface 28 is left at each end and that it is preferably somewhat higher than the outer surfaces of the teeth 7 or 7a to form a guiding surface against the surface of the skin, and thus prevent the teeth from being pushed too deeply into the skin and prevent cutting or irritating the skin. The teeth 13 on the movable cutter may have substantially straight sides as indicated in Figs. 16 and 17 or they may be inclined and these teeth can also be of considerable vertical thickness to give greater strength and rigidity. Their spacing is preferably different from that of the stationary teeth 7 so that they do not all perform their shearing action at the same time but will do their cutting in succession thus giving easier operation and being operable with a less powerful actuator. The spacing of these teeth 13 is preferably greater than that of the teeth 7. I prefer about half the number of teeth on the movable cutter as that of the stationary teeth 7. This in combination with a relatively long movement of the inner cutter, in excess of the pitch of the teeth of either cutter and preferably the larger pitch, and still further preferably three or four times this pitch, or equal to or greater than some multiple of the pitch of either set of teeth, is important in securing better operation. This is especially true where the dwell at each extreme of the cutter's movement is short as is true in the type of activator shown in my prior application Serial No. 250,349, filed January 11, 1939.

There may also be provided in the longitudinal slot 22 between the free edges of the teeth a longitudinally extending comb or guard 29. This is of a thickness less than the distance between the free ends of the teeth so that its opposite sides are spaced from these teeth 7 and 13 as shown in Figs. 2 and 3, and it also preferably has on its upper free edge transverse teeth 30 which are preferably in alignment with the stationary teeth 7 and of about the same width or thickness. The upper edge of this guard, or, that is, the free edges of these teeth, are preferably located at about the same level as the outer surface of the stationary guard teeth 7. This central guard or comb permits the use of a wider slot 22 between the free ends of the cutting teeth without danger of the skin entering sufficiently to be cut or irritated and at the same time this wider spacing permits more ready entrance of the hairs into cutting position, thus greatly increasing the speed of the shaving operation without increasing the danger of irritation to the skin. Also, in the shaving operation it is customary to move the cutter head back and forth over the skin with relatively short movements in a direction transversely of the cutter head, or that is, longitudinally of the cutter teeth, and it is customary in reversing the direction of movement to rock the head laterally somewhat on the surface engaging the skin. This central guard or comb 29 acts as a sort of guard and fulcrum on which this rocking takes place and it permits the rocking movement without removing either set of cutter teeth from the surface of the skin and thereby preventing proper shaving.

This central guard or comb 29 is constructed as shown in Figs. 1, 2, 5 and 6. It has downwardly extending end portions 31 and 32. The end portion 32 is split as shown at 33 and has a transverse opening 34 for one of the pins 9 passing transversely through the side members 6 and one of the end blocks 8 so that the member 29 is pivoted on this pin, the block 8 having a slot 35 extending inwardly from its end in which the portion 32 is inserted. To give a friction on the sides of this slot to maintain the guard 29 tight and help keep it in position, one part of the portion 32, such as the portion 32a, is bent laterally out of the plane of the member 29 as indicated in Fig. 6, so that when it is inserted in the slot 35 it is brought back into the plane of the member placing the lug 32a under tension, so that the resilient action of the metal causes a pressure on opposite sides of the slot 35, maintaining the guard in proper position. The opposite end portion 31 has a notch 36 to seat over the pin 9 on the opposite end of the head. This notch is of slightly less width than the diameter of this pin 9 so that as it is forced down over the pin the lugs or ears on the opposite sides of the slot are forced laterally away from each other a short distance, which action is permitted by the cut 37, thus placing the lugs under tension, and the resilient action of the metal frictionally engages the pin to hold the guard 29 in position. At its opposite ends the guard 29 is extended beyond the ends of the side members 6 as shown in Figs. 1 and 2; these extensions being indicated at 38 and 39. They are rounded at their upper edges and form a sort of guide and guard during the shaving operation and the lower shoulder 40 provides a finger grip to permit lifting of the end 38 of the guard to swing this end about the opposite pin 9 as a pivot to expose the guard for cleaning and also permit cleaning of the interior of the cutter and of the cutting teeth. The bottom wall 41 of the movable cutter 12 has a longitudinal slot 42 at each end to straddle the portions 31 and 32 of the guard or comb member 29 and permit the longitudinal reciprocating movement of the cutter 12. The inner ends of these slots 42 are inclined as indicated at 43 to prevent accumulation of cut hairs in the slot and permit easy clearing thereof.

It will be seen that from this arrangement there is provided a shaver which will be equally effective in each of its movements in opposite directions so the device may be operated by moving it back and forth over the surface to be shaved. The two rows of teeth on the opposite sides of slot 22 form in effect two opposed cutting devices extending or facing in opposite directions and spaced from each other the width of the slot 22. Each of these cutting devices includes a set of guard or guide teeth and a set of reciprocating or cutting teeth cooperating therewith, both sets of movable cutter teeth being on the reciprocating cutter 12. Therefore as these cutting devices are held against the surface of the skin and the head is moved over the surface back and forth in a direction transversely of the slot 22, first one cutting device on one side of the slot operates as a shaving device, and then when it is moved in the other direction the other cutting device on the opposite side of the slot operates as a shaving device, and therefore as the shaver is moved back and forth over the skin surface there is always a shaving device with the free ends of its guard teeth moving forwardly, which is the proper movement and relation for shaving. The space or slot 22 between the free ends of the cutting teeth give the proper space to permit free entrance of the hairs into the open slots or recess 25 and 26 between the teeth. It will also be seen that as one set of the shaving teeth on one side of the slot is moving forwardly in the cutting direction the other is moving ahead of it and against the surface of the skin, and therefore forms a guide to always maintain the teeth which are doing the cutting at the proper angle with relation to the surface of the skin for the best cutting effect, and prevents digging into the skin. To secure this proper angle all the user has to do is to hold the outer surface of the cutter head squarely against the surface of the skin. The longitudinal passage within the moving cutter 12 collects and conducts the cut off hairs from the shaving teeth so they are kept clear at all times.

To secure the cutting effect it is of course necessary that the cutter 12 be reciprocated in a direction longitudinally of the slot 22, or that is transversely of the guard teeth 7, and immediately back of the guard teeth and be held against the back of these teeth for the proper shearing effect. The amount of movement of the cutter 12 should be at least equal to the distance between the teeth 7, or it may be several times the amount, if desired. The teeth of the movable cutter 12 are held against the back of the stationary teeth 7 by a spring similar to spring 91 acting on pin 50 as shown in Fig 21 pressing the operating pin 19 against the movable cutter 12. This maintains the proper pressure between the teeth and automatically takes up wear.

The modifications shown in Figs. 21 to 58 are the same in principle, but are somewhat different from the construction of Figs. 1 to 20 in certain details. In these figures the central guard or comb 44 corresponding to the guard or comb 29 of the first form instead of being pivotally mounted in the central spacer blocks 45 is rigidly attached to or formed integral with one of these blocks as shown more clearly in Fig. 34. After the device is assembled this comb or guard is therefore always maintained in its original position and there is no danger of its being shifted out of this position and not properly returned to it. This also assures alignment of the teeth 44a of this guard on its outer edge with the teeth 47a of the stationary guard or outer cutter teeth.

It is preferred to use teeth on the guard 44 but it may be used without teeth if desired. It is also preferred to extend the ends of the central guard or comb 44 beyond the outer ends of portions 66 and round them as shown at 44b as these rounded ends of the guard prevent the skin contacting the sharp corners of the outer cutter elements and eliminate the necessity of making portions 66 raised above the outer surface of the outer cutter teeth. In assembling this head the two blocks are formed in one piece connected at their lower edges by a strip or tie bar 46. The side plates 47 are clamped against the opposite sides of this block in proper position and soldered to the block in the same manner as described in connection with Figs. 1 to 4, the opposite sides of the blocks or inner surfaces of the side plates being formed with tapered recesses 48 corresponding to the recesses 10 in the first form to hold solder 49 and from which it may run to the contacting surfaces between the plates 47 and the blocks 45. After the plates are assembled and soldered to the blocks the connection or tie bar 46 is removed by sawing it across adjacent the inner ends of the blocks 45, the lower edges of the plates 47 being provided with notches 49 to accommodate the saw. This leaves space for the operating pin 50 from the actuating motor to the inner movable cutter 51. The blocks 8 of Figs. 1 to 4 may be assembled in the same manner, using the connection 46 to hold them in position until assembled with the side plates 6 and then removing the connection 46 in the manner described. This manner of assembling makes it easier to get the spacing blocks 8 and 45 more accurately and properly positioned, and also insures more accurate and proper assembly.

The inner cutter 51 is the same as the cutter 12 as shown in Figs. 1 to 4 and 15 to 18 except that instead of having a notch in its lower wall 51a at both ends it has a notch 51b at one end only to accommodate the supporting standard 53 of the guard or comb 44. This has an additional advantage or function in combination with this means of mounting the comb or guard in that the inner cutter 51 can be inserted in the head in one position only and this prevents the inner cutter being reversed and placed in the head wrong end to with the possibility of the teeth of the inner cutter not being in the proper relation to the teeth of the outer cutter.

The shape of the teeth 47a of the outer guard or stationary cutter is somewhat different from that of the cutter head in Figs. 1 to 3. As shown more clearly in Figs. 27, 32 and 33, the free ends of the teeth are provided with extra metal at their tips and it may be on the outer skin engaging side as shown at 52 or on the inner or under side, or divided between the two. This is several thousandths of an inch thicker than the body of the tooth, and during the finishing operations of buffing and polishing some thousandths are removed so that this extra metal presents a rounded blunt end to the skin that does not puncture or irritate it in use. It also acts as a canopy over the sharp ends of the inner moving teeth 13 to prevent the skin from contacting these teeth. This extra thickness while the remainder of the teeth remains thinner gives an arrangement which will permit use of a wider slot between adjacent teeth by preventing the tips of the teeth of the inner cutter element from contacting the skin while shaving.

The full line thickness at 53 indicates the shape of the teeth after the buffing and polishing. The body or rear portion of the teeth indicated at 54 can have a thickness of .002 or .003 inch to give an extremely close shave. The thickness 5 of the tip may be about .010 inch, but as indicated above, buffing and polishing will remove some thousandths and also round off the corners, leaving an extremely smooth approach. In the form of Fig. 32 there is a rather abrupt depression 56 at the thin portion of the teeth giving a thicker support at the base 57. This, however, may be omitted as shown in Fig. 33 so that the thinner portion of the tooth can be carried back to the body of the plate.

The dimensions of course may vary but the following, by way of example, have been found very satisfactory. Thus, for example, the plate 47 may be about .031" in thickness and the length of the tooth 47a indicated at 53 may be about .060". The thickness of the tooth at 54, as indicated above, may be about .003" adjacent to its free end and tapers slightly to about .004" at its inner end. The depth of the slot or notch 60 between the teeth may be about .035", and the width of the increased thickness 52 indicated at 61 may be about .010". The width of the depression 56 Fig. 32 as indicated at 56a may be about .035". The width of the slot or spacing between the teeth is preferably about .010" as shown at 62, and the width of the teeth as shown at 63 is preferably about .015". The width of the teeth 44a on the guard 44 and their spacing are preferably about the same as that of the stationary cutter teeth 47a. It is also preferred that the free ends of the outer or stationary cutter teeth 47a overhang the ends of the inner cutter teeth 13 somewhat as shown at 64 in Fig. 33 and also in Fig. 26 to insure that these free ends of the inner teeth do not contact and irritate the skin.

It has also been found to be a material advantage to have the outer teeth 47a somewhat inclined downwardly and backwardly in opposite directions from their free ends as indicated in Figs. 26, 32 and 33. The outer skin contacting surfaces are preferably substantially flat, and although the angle of inclination may vary it is preferred that this angle, indicated at 65, be about 10 degrees. This has been found to permit the cutter to move smoothly and evenly over the skin surface and to sort of draw it to a uniform smooth condition and permit it to enter between the teeth just sufficiently to give a good close shave without irritating the skin. It also facilitates entrance of the hairs to proper cutting position.

Improved operation is secured by the arrangement shown in Fig. 14 by making alternate teeth in the stationary guard of different lengths; or putting it another way, making the alternate notches or spaces between the teeth of different lengths. This adds strength to the teeth permitting the use of thinner teeth and securing a closer shave. This effect is still further increased, as shown in Figs. 24 and 27, by making adjacent teeth or the notches between adjacent teeth of different lengths and placing the shorter spaces or notches adjacent to or on the opposite side of the tooth at one side of the longer notches. Thus as shown in these figures the notches are made of three different lengths with a longer notch 60a and a shorter notch next to it 60b and a still shorter notch next to that 60c, and then another long notch 60a, an intermediate notch 60b and so on. It will be seen that there is a short notch 60c on the opposite side of a tooth 47a from the longest notch 60a, so as to strengthen and stiffen this tooth, and in fact by this arrangement of various lengths of teeth and notches the teeth are materially strengthened and stiffened as the metal comes up farther on one side thereof, thus permitting the use of much thinner teeth and giving closer shaving. It is also preferred in assembling the side plates of the outer cutter that the longer notches or spaces 60a be opposite the shortest slots 60c; thus the shortest teeth are opposed to the longest teeth so that in going back and forth on the skin the longer teeth or cutting edge on the longer notches will cut the longer hairs and the shorter teeth or notches will cut the shorter hairs. Also the shorter spaces or notches being opposite the longer spaces or notches will tend to prevent the skin entering the longer spaces sufficiently to cause irritation, particularly where this arrangement is used without a central guard or comb. Although this arrangement is shown in Figs. 24 and 27 only, it is to be understood it may be used in the other cutter heads shown.

At the opposite ends of the cutter head are provided substantially wider guard and guide surfaces 66 to assist in preventing the teeth digging into the skin to irritate it. As shown in Fig. 31 this extends beyond the extreme movements of the end tooth 13a of the inner cutter 51. As with the type of actuator disclosed the stroke of the inner cutter may vary with the load, being somewhat shorter for heavier loads, if the under side of this extension were for its full width on a level with under side of the teeth 47a, it will be evident that because of this variation in stroke there would eventually be uneven wear on the inner surface of portion 68, so that on the longer movements of the inner cutter the outer tooth would run up on to a higher surface and tend to shift the inner cutter teeth away from the outer cutter teeth and interfere with the proper cutting of the hair. To obviate this the under surface of the extension 66 is relieved or cut back away from the tooth 13a as indicated at 67 in Fig. 31 to a point overlapping the tooth 13a at the point of its extreme movement even on the shortest stroke of the inner cutter. This insures that the wear on the inner surface or the under side of the teeth 47a and the extension 66 which are engaged by the inner movable teeth are all subject to the same amount of wear, giving uniform wear on all contacting surfaces between the teeth of the movable and stationary cutters. Thus the teeth of the two cutters remain in proper relative positions indefinitely.

A modified construction of the outer stationary cutter and guard teeth is shown in Figs. 39 to 43. These are formed on plates 68 corresponding to the side plates 6 and 47 of the previous forms, and are mounted on the opposite sides of the spacer blocks 8 and 45, the same as in the previous forms. At the upper or outer edge is a portion 69 extending laterally inward over the spacing blocks the same as in the previous forms, and in this portion 69 are formed the stationary cutter teeth 70. In this form, however, these teeth are of somewhat different shape than in the other forms. As shown in Fig. 40 they are of substantially inverted T-shape in cross section, with the cross bar 71 separated by the notches 72 and with the cutting edges 73 at the opposite edges and inner walls of these cross bars to cooperate with the teeth 13 of the inner movable cutter 12. The leg or rib 74 extends longitudinally at the outer or skin contacting side of the teeth and preferably at substantially the center of the tooth. These ribs add strength and stiffness to the teeth and form the main skin contacting surface, preventing the skin entering too far into the notches 72 between the teeth to be cut or irritated by the movable cutter teeth 13. In making this cutter the portion 69 is substantially plain as shown in dotted lines Fig. 43. Before hardening and while still soft, the grooves 75 are milled or broached of proper width and spacing to form the rib 74. Then after the metal is hardened and tempered the notches 72 are ground into the connecting walls 76 at the bottom of the groove between the ribs 74, and then the surfaces are all buffed and polished, which rounds off the outer corners of the rib 74 and body or cross bars 71 as well as the free ends of the teeth and the ribs giving a smooth contact with the skin and minimum irritation to the skin.

The dimensions of course may vary, but the following have been found to be very satisfactory. The thickness of the ribs indicated at 77 Fig. 40 may be about .006", the thickness of the cross bar indicated at 78 about .003", the width of the cross bar indicated at 79 about .015", the width of the slot between the teeth indicated at 80 about .010", and the total height indicated at 81 also about .010". The depth of the slot 72 indicated at 82 is about .035" to .040". The thickness .003" for the bar 71 and the .010" for the total thickness are substantially uniform along the entire length of the tooth, the ribs 74 giving sufficient strength and stiffness to permit this. This permits very fast or quick shaving.

While in the various forms illustrated an uneven number of teeth is shown on the inner cutter in relation to the number of outer cutter teeth, an even or like number can be used. The first arrangement causes the teeth to cut in succession instead of all at once, thus reducing the power required and greatly reducing the liability of stalling. It is preferred because of the relatively long travel of the inner cutter element adopted in this particular shaver, that the width of the inner teeth be somewhat in excess of the opening between the outer teeth. Thus for example it has been found satisfactory to make the width of teeth 13 as shown at 13a Fig. 28 about .015" and the distance 13b between them about .030".

There may be a slight difference in the angles of the contacting surfaces of the inner and outer cutter elements. Thus for example there may be a slight difference in the angle of inclination of the inner surface 14 (Fig. 13) of the outer teeth and the angle of inclination of the outer surface 13a (Fig. 15) of the teeth 13 of the inner cutter element. Similarly in Fig. 32 there may be a slight difference in the angles of the inner surfaces 47a of the teeth 13 of the outer cutter, and in Fig. 33 between the angles of the inner surface 64 of the outer teeth and the outer surface of teeth 13. In the same way in Fig. 41, there may be a slight difference in the angles of the inner surface of teeth 71 and outer surface of teeth 13. With the extremely thin outer teeth which it is possible to secure with the present construction these teeth would spring back under slight pressure as they are pressed against the skin to conform to the wider angles on the teeth of the inner cutter and be supported thereon. So that no catching would occur between the respective edges of the inner and outer teeth the inner teeth must be wider than the space between the outer teeth. A tooth in the outer element that would be under spring tension against inner moving element could be made throughout its length .002 or .003 inch thick, which would give an extremely close and quick shave. It would also reduce friction and wear between the surfaces of the inner and outer teeth.

One means for mounting the cutter head in the motor housing and the operative connection from the motor are shown in Figs. 21, 22, 36, 37 and 38. The motor housing indicated at 83 is usually made of some molded plastic and in two sections suitably connected together to enclose a suitable operating motor 64. This may be of different types, but as indicated is that shown in my prior application Serial No. 250,349, filed January 11, 1939, as an A. C. oscillating motor, having suitable wiring and pole members for oscillating an armature (not shown), which through the yoke 85 oscillates the driving pin 50 connected to the yoke by the threaded stud 86. In the arrangements shown, the lower end of the stud 86 passes through the yoke 85 and bar 88 and is threaded into the bar 89. It is held against loosening by a lock nut 90. A spring 91 reacting against this nut and a collar 92 on the pin 50 tends to hold the rounded or semi-ball shaped end of this pin in the recess 93 in the bottom wall 51a of the inner movable cutter. In assembling, the drive pin 86 is threaded and forced into a formed hole in the pin 50. This will assure a perfect fit in the outer drive pin. A stiff grease is packed around the threads to eliminate all noise and rattle.

The housing has a transverse groove 94 in which the cutter head is mounted. It is held in this groove by a retaining spring 95. This is shown more in detail in Figs. 36 and 37, as well as in Fig. 21. It has a body portion 96 seating on the bottom of groove 94 and has an elongated opening 97 through which the driving pin 50 projects. At the opposite ends of this opening are inwardly projecting retaining fingers 98 which pass through the opening 99 in the bottom wall of the groove in the housing and are folded over at their free ends 100 onto the inner surface of the wall of his housing to retain the spring in the groove. The opposite ends of the spring are bent downwardly and backwardly to form loops 101 and 102 and provide spring fingers 103 and 104 to grip the opposite ends of the cutter head to retain it in the groove. The free end portions of these fingers are reversely bent at 105 to seat in notches 106 (Fig. 34) to retain the head in the groove. The shape of the spring when free is shown in Fig. 37. When applied in the groove in the housing it is straightened and therefore stressed as shown in Fig. 21 so that the ears will grip the wall of the housing. One end finger, such as for example finger 103, is tightly closed against the end of the body portion 96 as shown in Fig. 21 and preferably is preloaded so that when the cutter head is slipped into position between this finger and the finger 104, the finger 104 will yield to clamp the head between the fingers as shown in Fig. 21. This will insure that although the head is tightly gripped by the spring fingers it is always positioned in the same relative position in the housing by the finger 103. All the forms of cutter heads shown can be mounted in the housing by this same gripping means, it being only necessary to provide the notches 106 in the ends of the cutter head in the form shown in Fig. 1 as well as the other forms.

Somewhat modified constructions are shown in Figs. 44 to 58. In Figs. 44 to 51 the spacing blocks 107 are made from stampings of sheet metal instead of being substantially solid blocks as shown in the other forms. The development is shown in Figs. 50 and 51, in which as indicated the side portions 108 of a plate of proper gauge or thickness is bent laterally into substantially parallel relation to form the side walls 109, and a lug 110 at one end is bent laterally in the same direction to form the end wall 111. These blocks are used the same as the blocks 8 and 45 of Figs. 1 to 8 and 21 to 25, 34 and 35, to space the side plates 112 having their upper edge portions inclined inwardly toward each other and providing stationary cutter teeth 113 corresponding to the stationary cutter teeth in the other forms. In this arrangement the recesses 114 for holding the solder 115 and supplying it to the contacting surfaces between the blocks and plates are formed in the side plates 112 by pressing a portion of the walls outwardly as indicated at 116, and the side plates are soldered to the sides of the spacing blocks 107 the same as in the first form. This forming of the recesses in the inner surface of the side plates by pressing out the walls forms ribs 118 on the outer surfaces of the side plates which may be slid into grooves 117 of corresponding shape and width on the inner sides of the transverse groove 94 in the portion 118 of the inclosing casing 83; thus forming a convenient means for locating and holding the cutter head in proper position within the casing. The outer sides of the plates 112 may be provided with cuts or recesses 119 providing a shoulder 119a to be engaged by the ends of spring grips or other locking means, not shown, to prevent the head from sliding out of the recess in the casing. The same inner or movable cutter 12 or 51 may be used as in the other forms shown, and the intermediate guard 44 may or may not be used depending on the spacing between the two rows of teeth. If the guard 44 is used it may be fastened at one end to one of the spacer blocks 107 as indicated at 120, the same as in the arrangement shown in Fig. 21 and the inner movable cutter 51 will be slotted at 51b so as to embrace this connected end as shown in Figs. 21 and 23, the other end of the guard 44 being free the same as in Figs. 21 and 23.

Figs. 52 to 58 show somewhat different operative connections from the activator or motor to the movable cutter 51. Thus in Figs. 52 and 53 a stud 121 is threaded into the bottom wall 51a of the cutter and has a rounded or semi-ball shaped end 122 seated in a similarly shaped recess in a spring 123 formed by pressing laterally a portion 124 of this spring. The spring has an intermediate portion 125 with one arm 126 bent backwardly over it in which the recessed portion 124 is formed. The other free end portion 127 may be connected by any suitable means 128 with the movable yoke 85 (Figs. 21 and 22) of the actuator or motor. When assembled the spring is stressed so that it presses upwardly on pin 121 to hold the end of this pin in the recess in the spring and pressing the teeth 13 on this movable cutter against the under sides of the teeth 113 of the outer or stationary cutter to secure the proper shearing effect.

In Figs. 54 to 58 the driving pin 129 has a rounded or semi-ball shaped end 130 seated in a similarly shaped recess 131 in the bottom wall 51a of the cutter. This pin has a reduced portion 129a passing through two vertically spaced springs 132 and 133; the springs having openings 133a therethrough to correspond with the diameter of the reduced portion. This forms a shoulder 135 against which spring 133 seats. A spacing sleeve 129b embraces the reduced portion 129a and the two springs are clamped by a screw 134. The springs are stressed so that they press the end of the pin 129 in the recess 131 and hold it therein, and also hold the teeth 13 of the inner cutter 51 against the under sides of the teeth 113 of the outer cutter. The outer ends of the springs 132 and 133 are bent downwardly to form like portions 136 and 137 respectively clamped by means of a bolt 128 between stiffener plates 139 and 140, and also to secure the plates to any suitable driving connection 141 connected to the yoke 85 of the actuator or motor. The plate 139 has a short backing-up extension or tongue 142 engaging the inner side of the leg portion 136 while the plates 140 have longer lugs or extensions 143 engaging the leg portion 137 of the spring 133; these extensions backing up and stiffening or supporting the spring. The horizontal portion of the springs can be stiffened also by providing them with a longitudinal offset rib 44 pressed into these portions. These driving connections of Figs. 52 and 54 are simpler than the driving pin connection shown in Figs. 21 and 22 and therefore are preferred. They are also easier to assemble, but they both act to yieldingly press teeth 13 on the inner cutter against the inner sides of the teeth of the outer cutter to secure the proper pressure between them and give the proper shearing action.

The structures of cutter heads described are very effective in giving a clean rapid shave and cutting the hair close to the skin without cutting or irritating the skin. Also the structure of the head comprising the spacing blocks and separate side plates secured thereto on which the stationary skin contacting guard and cutter teeth are formed greatly facilitates the manufacture, and particularly facilitates accuracy in cutting and finishing these outer stationary teeth to secure proper dimensions and also proper fit in relation to the inner or movable cutter teeth to insure effective cutting operations and will insure that the accurate and proper fit will be maintained indefinitely.

Having thus set forth the nature of my invention, what I claim is:

1. In a hair cutter, a skin contacting member adapted to pass over the skin for cutting hair therefrom, said member being provided with sets of opposed teeth having free ends extending toward but not reaching each other and separated by slots, certain recurring slots between the teeth being deeper than other adjacent slots to provide longer cutting edges, and a cutter provided with spaced sets of similarly opposed teeth having free ends extending toward each other operating adjacent the member and cooperating therewith to cut hair from the skin as the cutter is passed thereover.

2. A cutter head of the character described comprising a pair of longitudinally spaced mounting blocks, members secured to the opposite sides of the blocks having free edge portions extending laterally toward each other and inclined outwardly away from the blocks at a sufficiently small angle so that their outer surfaces simultaneously engage the skin surface, said free edge portions each having a row of stationary cutter teeth with the free ends of the teeth in each row extending toward the other row and spaced from the free ends thereof to provide a longitudinal slot between them, a cutter mounted between said members for longitudinal reciprocating movement and provided with two longitudinal spaced rows of cutter teeth at the inner surfaces of the stationary teeth and movable transversely thereof and means located between the blocks for connecting the cutter with an actuator for operating the cutter.

3. In a hair cutting device of the character described, a cutter head comprising a body having on one face two spaced rows of stationary teeth facing in opposite directions with their free ends toward each other and inclined in opposite directions backwardly and away from said free ends, the free ends of said teeth having additional metal making said free ends thicker than the body of the teeth, a separate set of cutter teeth cooperating with each row of stationary teeth, said two sets of cutter teeth being spaced from each other with the free ends in each set directed toward the other set, and means for reciprocating the cutter teeth in a direction transversely of the stationary teeth.

4. In a device of the character described, a cutter head comprising a body having a longitudinal passage adjacent one outer wall with a longitudinal slot in said wall communicating with said passage, the opposite edges of said slot comprising closely spaced guard teeth extending transversely of the slot and with their free ends at the edges of the slot, said free end portions having extra metal on the outer skin contacting sides so that the free ends are thicker than the body of the teeth, a cutter in said passage having two rows of cutter teeth at the inner sides of the guard teeth to cooperate therewith, and means for reciprocating the cutter in a direction longitudinally of the slot.

5. In a hair cutting device of the character described, a cutter head comprising a body having at one edge two spaced rows of stationary teeth facing in opposite directions with their free ends toward each other, a separate set of cutter teeth cooperating with each row of stationary teeth, said two sets of cutter teeth being spaced from each other with the free ends of the teeth in each set directed toward the other set, a central stationary guard between the free ends of the teeth and spaced therefrom, said guard being permanently secured to the body at one end and detached and spaced therefrom at its opposite end to permit insertion of the inner cutter between the guard and the body, and means for reciprocating the inner cutter in a direction transversely of the stationary teeth.

6. In a cutter head, a body having a pair of spaced toothed edges forming stationary cutters and arranged with the free ends of the teeth facing each other, a cutter in the body movable relatively thereto and having teeth cooperating with the teeth of said edges for the cutting of hair, a stationary guard between said toothed edges and spaced therefrom, said guard being permanently secured to the body at one end and free and spaced therefrom at the other end to permit insertion of the cutter between the guard and the body and positioned to prevent the flesh of a user entering between the spaced toothed edges of the body, and said cutter having a longitudinal slot leading from one end only to embrace the attached end portion of the guard.

7. A cutter head of the character described comprising mounting blocks, plate members secured to the opposite sides of the blocks and having free edge portions extending laterally toward each other, said free edge portions each having a row of stationary cutter teeth with the free ends of each row extending toward the other row and spaced from the free ends thereof to provide a longitudinal slot between them, a stationary guard between said toothed edges and spaced therefrom, said guard being permanently attached to one block at one end and free and spaced from the block at its opposite end to permit insertion of a movable cutter between the guard and the body, and a cutter mounted between said plate members for longitudinal reciprocating movement and provided with two longitudinal spaced rows of cutter teeth at the inner surfaces of the stationary teeth and movable transversely thereof and said cutter having a longitudinal slot extending inwardly from one end only to embrace the attached end portion of said guard.

8. In a cutter head of the character described, a body having a skin contacting surface with a series of transversely extending closely spaced stationary teeth arranged with their free ends at one edge of said surface, said free ends having additional metal on the outer skin contacting side to make said free end portions of greater thickness than the body of the teeth, and a movable cutter having a series of spaced transversely extending teeth at the inner side of the stationary teeth and movable transversely thereof to cooperate with the stationary teeth.

9. In a cutter head, a mounting block, a plate member secured to one side of the block, one edge portion of the plate member extending beyond the block and inclined inwardly thereover, said inclined portion having a series of closely spaced stationary teeth to engage the skin, the free ends of said teeth having additional metal to make said free end portions thicker than the body of the teeth, and a cutter having a series of spaced teeth at the inner sides of the stationary teeth and movable transversely of the stationary teeth to cooperate therewith.

10. In a cutting device of the character described, a motor casing having a transverse groove at one end to receive a cutter head, there being an opening in the bottom of the groove for passage of an operative connection from the motor to the head, a spring member seated in the bottom of said groove and having fingers extending through said opening and overlapping the walls at the inner end of said opening to secure said member in the groove, and said member including resilient fingers at the opposite ends thereof having holding means to engage shoulders at the ends of the cutter head to retain said head in the groove.

11. In a cutter head of the character described, a body having a skin contacting surface with a series of transversely extending closely spaced stationary teeth arranged with their free ends at one edge of said surface, wider skin engaging guiding portions at the opposite ends of said series, a movable cutter having a series of transversely extending teeth engaging the inner sides of the stationary teeth and movable transversely of the stationary teeth to cooperate therewith for the cutting operation, and the under sides of said wider guiding portions being relieved beyond and at least up to the normal extreme movements of the end teeth of the movable cutter so that the underside surfaces of said portions beyond the end teeth at their normal extreme movements are spaced outwardly of the outer portions of these movable teeth.

12. In a hair cutter, a skin contacting member adapted to pass over the skin for cutting hair therefrom, said member being provided with sets of opposed teeth having free ends extending toward but not reaching each other and separated by notches, certain recurring notches between the teeth being deeper than other adjacent notches to provide longer cutting edges, said sets of teeth being arranged so that the shorter notches in one set are opposite longer notches in the other set, and a movable cutter provided with spaced sets of similarly opposed teeth having free ends extending toward each other operating at the inner sides of the other teeth and movable transversely thereof and cooperating therewith to cut hair from the skin as the member is passed thereover.

13. In a hair cutter, a skin contacting member adapted to pass over the skin for cutting hair therefrom, said member being provided with two sets of opposed teeth having free ends extending toward but not reaching each other and separated by notches, the successive notches between teeth being of different lengths to provide cutting edges on adjacent teeth of different lengths, and a movable cutter provided with spaced sets of similarly opposed teeth having free ends extending toward each other operating at the inner sides of the other teeth and movable transversely thereof and cooperating therewith to cut hair from the skin as the member is passed thereover.

14. In a hair cutter, a skin contacting member adapted to pass over the skin for cutting hair therefrom, said member being provided with two sets of opposed teeth having free ends extending toward but not reaching each other and separated by notches, the successive notches between teeth being of different lengths to provide cutting edges on adjacent teeth of different lengths, said notches being arranged in series with the longest notch, then a shorter notch and a still shorter next to it, then the longest again, a shorter and a still shorter and so on, and a movable cutter provided with spaced sets of similarly opposed teeth having free ends extending toward each other operating at the inner sides of the other teeth and movable transversely thereof and cooperating therewith to cut hair from the skin as the member is passed thereover.

15. In a hair cutter, a skin contacting member adapted to pass over the skin for cutting hair therefrom, said member being provided with two sets of opposed teeth having free ends extending toward but not reaching each other and separated by notches, the successive notches between teeth being of different lengths to provide cutting edges on adjacent teeth of different lengths, said sets of teeth being arranged so that the shorter notches in one set are opposite longer notches in the other set, and a movable cutter provided with spaced sets of similarly opposed teeth having free ends extending toward each other operating at the inner sides of the other teeth and movable transversely thereof and cooperating therewith to cut hair from the skin as the member is passed thereover.

16. A cutter head of the character described comprising laterally spaced side members having free edge portions extending laterally toward each other, said free edge portions each having a row of stationary cutter teeth with the free ends of each row extending toward the other row and spaced from the free ends thereof to provide a longitudinal slot between them, a movable cutter member mounted between said members for longitudinal reciprocating movement and provided with two longitudinal spaced rows of cutter teeth at the inner surfaces of the stationary teeth and movable transversely thereof to cooperate with the stationary teeth to cut hair, the spacing or pitch of the movable teeth being different from that of the stationary teeth and not a multiple thereof so that they cut in succession, and means for shifting the movable cutter each stroke a distance in excess of the pitch of one set of teeth.

17. A cutter head of the character described comprising laterally spaced side members having free edge portions extending laterally toward each other, said free edge portions each having a row of stationary cutter teeth with the free ends of each row extending toward the other row and spaced from the free ends thereof to provide a longitudinal slot between them, a movable cutter member mounted between said members for longitudinal reciprocating movement and provided with two longitudinal spaced rows of cutter teeth at the inner surfaces of the stationary teeth and movable transversely thereof to cooperate with the stationary teeth to cut hair, the pitch of the movable teeth being different from that of the stationary teeth and different from a multiple thereof so that they cut in succession, and means for shifting the movable cutter each stroke a distance at least equal to some multiple of the pitch of one set of teeth.

18. In a hair cutting device of the character described, a cutter head comprising a body having at one edge two spaced rows of stationary teeth facing in opposite directions with their free ends toward each other, an inner cutter having a separate set of cutter teeth cooperating with each row of stationary teeth, said two sets of cutter teeth being spaced from each other with the free ends of the teeth in each set directed toward the other set, a central stationary guard extending longitudinally between the free ends of the teeth and spaced therefrom, the free edge of the guard being provided with spaced transverse teeth to prevent the flesh of the user entering between the spaced rows of stationary teeth, said guard extending at its opposite ends beyond the ends of the body and curved backwardly to form a guide and guard during shaving, and means for reciprocating the inner cutter in a direction transversely of the stationary teeth.

19. A method of assembling a cutter head for a hair cutter comprising forming two spaced mounting blocks in one piece connected at one edge by an integral strip or tie bar, clamping against the opposite sides of these blocks a pair of members having free edge portions spaced from the blocks extending laterally toward each other and each adapted to be provided with a row of stationary cutter teeth, soldering said members to the blocks while so clamped, and then removing the strip or tie bar by cutting it across at the inner ends of the blocks.

THOMAS J. MURPHY.